United States Patent [19]

Ando et al.

[11] Patent Number: 4,989,762
[45] Date of Patent: Feb. 5, 1991

[54] MOLTEN STEEL POURING NOZZLE

[75] Inventors: Mitsuru Ando; Takafumi Aoki, both of Gifu, Japan

[73] Assignee: Akechi Ceramics Co., Ltd., Ena, Japan

[21] Appl. No.: 460,239

[22] Filed: Jan. 2, 1990

[30] Foreign Application Priority Data

Feb. 7, 1989 [JP] Japan .................................. 1-28279

[51] Int. Cl.$^5$ ............................................. B22D 41/08
[52] U.S. Cl. ..................................... 222/607; 501/104
[58] Field of Search ....................... 222/591, 606, 607; 501/99, 100, 102, 103, 104, 106

[56] References Cited

U.S. PATENT DOCUMENTS 4,585,485  4/1986  Shikano et al. ...................... 501/100
4,849,383  7/1989  Tanemura et al. ................... 501/103

*Primary Examiner*—S. Kastler
*Attorney, Agent, or Firm*—Frishauf, Holtz, Goodman & Woodward

[57] ABSTRACT

A molten steel pouring nozzle having along the axis thereof a bore through which molten steel flows. At least part of an inner portion of the molten steel pouring nozzle, which inner portion forms said bore, is formed with a refractory consisting essentially of:

zirconia clinker comprising cubic zirconia and calcium zirconate: from 40 to 85 wt. %, where, the content of calcium oxide in said zirconia clinker being within the range of from 3 to 35 weight parts relative to 100 weight parts of said zirconia clinker;

graphite: from 10 to 30 wt. %;

and at least one element selected from the group consisting of:

silica: from 1 to 15 wt. %, and magnesia: from 1 to 15 wt. %.

12 Claims, 1 Drawing Sheet

MOLTEN STEEL POURING NOZZLE

As far as we know, there is available the following prior art document pertinent to the present invention: Japanese Patent Provisional Publication No. 57-71,860 dated May 4, 1982.

The contents of the prior art disclosed in the above-mentioned prior art document will be discussed hereafter under the heading of the "BACKGROUND OF THE INVENTION".

FIELD OF THE INVENTION

The present invention relates to a molten steel pouring nozzle which permits effective prevention of reduction or clogging of a bore of the nozzle, through which molten steel flows, when continuously casting an aluminum-killed molten steel containing aluminum.

BACKGROUND OF THE INVENTION

Continuous casting of molten steel is carried out, for example, by pouring molten steel, received from a ladle in a tundish, through a molten steel pouring nozzle secured to the bottom wall of the tundish, into a vertical mold arranged below the molten steel pouring nozzle to form a cast steel strand, and continuously withdrawing the thus formed cast steel strand into a long strand.

As the above-mentioned molten steel pouring nozzle, a nozzle comprising an alumina-graphite refractory is widely used in general.

However, the molten steel pouring nozzle comprising an alumina-graphite refractory has the following problems:

When casting an aluminum-killed molten steel, aluminum added as a deoxidizer reacts with oxygen present in molten steel to produce non-metallic inclusions such as $\alpha$-alumina. The thus produced non-metallic inclusions such as $\alpha$-alumina deposit and accumulate onto the surface of the bore of the molten steel pouring nozzle, through which molten steel flows, to clog up the bore, thus making it difficult to achieve stable casting. In addition, the non-metallic inclusions such as $\alpha$-alumina thus accumulated onto the surface of the bore are peeled off or fall down, and are entangled into the cast steel strand, thus degrading the quality of the cast steel strand.

For the purpose of preventing the above-mentioned reduction or clogging of the bore of the molten steel pouring nozzle caused by the non-metallic inclusions such as $\alpha$-alumina, there is proposed a method which comprises ejecting an inert gas from the surface of the bore of the molten steel pouring nozzle toward molten steel flowing through the bore, to prevent the non-metallic inclusions such as $\alpha$-alumina present in molten steel from depositing and accumulating onto the surface of the bore (hereinafter referred to as the "prior art 1").

However, the above-mentioned method of the prior art 1 has the following problems:

A larger amount of the ejected inert gas causes entanglement of bubbles produced by the inert gas into the cast steel strand, resulting in the production of defects such as pinholes in a steel product after the completion of rolling. This problem is particularly serious in casting of molten steel for a high-quality thin steel sheet. A smaller amount of the ejected inert gas causes, on the other hand, deposition and accumulation of the non-metallic inclusions such as $\alpha$-alumina onto the surface of the bore of the molten steel pouring nozzle, thus causing reduction or clogging of the bore. In the casting of molten steel for a long period of time, a stable control of the amount of ejected inert gas from the surface of the bore of the molten steel pouring nozzle becomes gradually more difficult, accordingly as the structure of the refractory forming a molten steel pouring nozzle degrades. As a result, the non-metallic inclusions such as $\alpha$-alumina deposit and accumulate onto the surface of the bore of the molten steel pouring nozzle, thus causing reduction or clogging of the bore. Furthermore, in the casting of molten steel for a long period of time, a local erosion of the surface of the bore of the molten steel pouring nozzle is considerably accelerated by the ejected inert gas. This makes it impossible to continue the ejection of the inert gas and may cause rapid clogging of the bore.

With a view to solving the above-mentioned problems without employing a mechanical means such as the ejection of an inert gas, a molten steel pouring nozzle comprising a boron nitride refractory is usually used (hereinafter referred to as the "prior art 2").

However, the above-mentioned molten steel pouring nozzle of the prior art 2 has the following problems:

The molten steel pouring nozzle comprising a boron nitride refractory has a very high manufacturing cost. In addition, the function of this nozzle for inhibiting deposition of the non-metallic inclusions such as $\alpha$-alumina onto the surface of the bore is not sufficient. Furthermore, boron nitride has a high thermal expansion coefficient. When, therefore, integrally manufacturing a molten steel pouring nozzle by the use of an alumina-graphite refractory for an outer portion of the molten steel pouring nozzle, and a boron nitride refractory for an inner portion of the molten steel pouring nozzle, which inner portion forms the bore, the connection is poor in the interface between the alumina-graphite refractory forming the outer portion of the molten steel pouring nozzle and the boron nitride refractory forming the inner portion of the molten steel pouring nozzle, so that peeloff of the boron nitride refractory from the alumina-graphite refractory during casting of molten steel may make it difficult to accomplish casting.

For the purpose of preventing clogging of the bore of the molten steel pouring nozzle, furthermore, there is disclosed in Japanese Patent Provisional Publication No. 57-71,860 a molten steel pouring nozzle formed with a refractory consisting essentially of:

graphite: from 10 to 50 wt. %,
calcium oxide: from 20 to 75 wt. %,
and
the balance being a refractory aggregate.

The above-mentioned refractory aggregate may additionally contain metallic aluminum within the range of from 1 to 15 weight parts relative to 100 weight parts of the refractory aggregate (hereinafter referred to as the "prior art 3").

However, the above-mentioned molten steel pouring nozzle of the prior art 3 has the following problems:

It is true that calcium oxide (CaO) rapidly reacts with the non-metallic inclusions such as $\alpha$-alumina produced through reaction of aluminum added as a deoxidizer with oxygen present in molten steel, to produce low-melting-point compounds. Therefore, calcium oxide has a function of preventing the non-metallic inclusions such as $\alpha$-alumina from depositing and accumulating onto the surface of the bore. However, calcium oxide, when present alone, violently reacts with water or moisture in the air even at a room temperature to produce calcium hydroxide ($Ca(OH)_2$), which is easily disintegrated and tends to become powdery, thus easily causing degradation of the structure of the molten steel pouring nozzle. Great care is therefore necessary for storing the molten steel pouring nozzle. In addition, because of the high thermal expansion coefficient of calcium oxide, a considerable thermal stress is produced in the interior of the molten steel pouring nozzle when calcium oxide is present alone and subjected to heating which causes a non-uniform temperature distribution, thus resulting in a lower thermal shock resistance of the molten steel pouring nozzle.

For the problems as described above, it is difficult to use a molten metal pouring nozzle made of a refractory, in which calcium oxide is present alone, for a long period of time for the continuous casting of molten steel.

Under such circumstances, there is a strong demand for the development of a molten steel pouring nozzle which permits prevention of reduction or clogging of the bore of the nozzle and degradation of the structure of the refractory forming the nozzle, economically and for a long period of time without employing a mechanical means such as the ejection of an inert gas, but such a molten steel pouring nozzle has not as yet been proposed.

SUMMARY OF THE INVENTION

An object of the present invention is therefore to provide a molten steel pouring nozzle which permits prevention of reduction or clogging of the bore of the nozzle and degradation of the structure of the refractory forming the nozzle economically and for a long period of time without employing a mechanical means such as the ejection of an inert gas.

In accordance with one of the features of the present invention, there is provided a molten steel pouring nozzle having along the axis thereof a bore through which molten steel flows, characterized in that:

at least part of an inner portion of said molten steel pouring nozzle, which inner portion forms said bore, is formed with a refractory consisting essentially of:

zirconia clinker comprising cubic zirconia and calcium zirconate:from 40 to 85 wt. %, where, the content of calcium oxide in said zirconia clinker being within the range of from 3 to 35 weight parts relative to 100 weight parts of said zirconia clinker;

graphite:from 10 to 30 wt. %;
and
at least one element selected from the group consisting of:

silica:from 1 to 15 wt. %,
and
magnesia:from 1 to 15 wt. %.

DETAILED DESCRIPTION OF PREFERRED EMBODIMENTS

Figure 1:
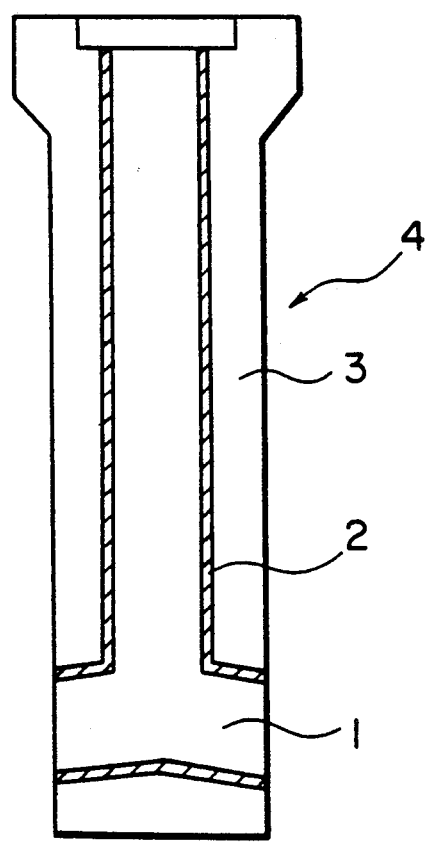
FIG. 1 is a schematic vertical sectional view illustrating an embodiment of the molten steel pouring nozzle of the present invention as an immersion nozzle.

From the above-mentioned point of view, extensive studies were carried out to develop a molten steel pouring nozzle which permits prevention of reduction or clogging of the bore of the nozzle and degradation of the structure of the refractory forming the nozzle, economically and for a long period of time without employing a mechanical means such as the ejection of an inert gas.

As a result, the following findings were obtained: By forming a molten steel pouring nozzle with a refractory in which calcium oxide coexists with zirconia, it is possible to inhibit the violent reaction of calcium oxide with water or moisture in the air, thus preventing degradation of the structure of the molten steel pouring nozzle. It is also possible to prevent the non-metallic inclusions such as $\alpha$-alumina from depositing and accumulating onto the surface of the bore of the molten steel pouring nozzle, by the production of low-melting-point compounds through reaction of calcium oxide in the zirconia clinker, on the surface of the bore, with the non-metallic inclusions such as $\alpha$-alumina, which are produced through reaction of aluminum added into molten steel as a deoxidizer with oxygen present in molten steel.

More specifically, zirconia clinker having a prescribed particle size is prepared by melting calcium oxide and zirconia in an electric furnace at a temperature of at least 1,600° C., then cooling the resultant melt to solidify same, and then pulverizing the resultant solid. The thus prepared zirconia clinker, which comprises cubic zirconia and calcium zirconate ($CaO;ZrO_2$), has a stability similar to stabilized zirconia, and has a low thermal expansion coefficient, and inhibits the violent reaction of calcium oxide with water or moisture in the air, thus preventing degradation of the structure of the molten steel pouring nozzle.

Furthermore, when the above-mentioned zirconia clinker coexists with silica and/or magnesia in a prescribed amount, calcium oxide in each particle of zirconia clinker tends to easily move towards the surface of each particle of zirconia clinker under the effect of the above-mentioned coexisting silica and/or magnesia. In other words, calcium oxide, which is to react with $\alpha$-alumina in molten steel, i.e., the main constituent of the non-metallic inclusions depositing onto the surface of the bore of the molten steel pouring nozzle, moves towards the surface of each particle of zirconia clinker and gathers there. This permits inhibition of the violent reaction of calcium oxide with water or moisture in the air, and causes the continuation of the reaction between calcium oxide and $\alpha$-alumina to produce the low-melting-point compounds, thus allowing effective prevention for a long period of time of deposition and accumulation of the non-metallic inclusions such as $\alpha$-alumina onto the surface of the bore of the molten steel pouring nozzle.

The present invention was developed on the basis of the above-mentioned findings. At least part of an inner portion of the molten steel pouring nozzle of the present invention, which inner portion forms a bore thereof, is formed with a refractory consisting essentially of:

zirconia clinker comprising cubic zirconia and calcium zirconate:from 40 to 85 wt. %, where, the content of calcium oxide in said zirconia clinker being within the range of from 3 to 35 weight parts relative to 100 weight parts of said zirconia clinker;

graphite:from 10 to 30 wt. %;
and
at least one element selected from the group consisting of:

silica:from 1 to 15 wt. %,
and
magnesia:from 1 to 15 wt. %.

Now, the following paragraphs describe the reasons of limiting the chemical composition of the refractory forming at least part of an inner portion of the molten steel pouring nozzle of the present invention as mentioned above.

(1) Zirconia clinker:

Zirconia clinker has a low thermal expansion coefficient and an excellent spalling resistance. When the content of zirconia clinker is under 40 wt. %, however, the amount of calcium oxide, which is to react with the non-metallic inclusions such as α-alumina in molten steel, becomes insufficient, thus making it impossible to prevent deposition and accumulation of the non-metallic inclusions such as α-alumina onto the surface of the bore of the molten steel pouring nozzle. When the content of zirconia clinker is over 85 wt. %, on the other hand, the thermal expansion coefficient increases, and the spalling resistance is deteriorated. The content of zirconia clinker should therefore be limited within the range of from 40 to 85 wt. %. Zirconia clinker should preferably have an average particle size of up to 44 μm to ensure a good surface smoothness of the nozzle.

(2) Calcium oxide contained in zirconia clinker:

Calcium oxide contained in zirconia clinker, of which the property of violently reacting with water or moisture in the air is largely decreased, reacts with the non-metallic inclusions such as α-alumina in molten steel to produce the low-melting-point compounds. When the content of calcium oxide in zirconia clinker is under 3 weight parts relative to 100 weight parts of zirconia clinker, however, a desired effect as described above cannot be obtained, and the presence of baddeleyite ($ZrO_2$) in zirconia clinker causes degradation of the structure of the molten steel pouring nozzle. When the content of calcium oxide in zirconia clinker is over 35 weight parts relative to 100 weight parts of zirconia clinker, on the other hand, calcium oxide, which is not dissolved into calcium zirconate, reacts violently with water or moisture in the air and has a high thermal expansion coefficient, is present alone in zirconia clinker, resulting in degradation of the structure of the molten steel pouring nozzle. The content of calcium oxide in zirconia clinker should therefore be limited within the range of from 3 to 35 weight parts relative to 100 weight parts of zirconia clinker.

(3) Graphite:

Graphite has a function of improving an oxidation resistance as well as a wetting resistance against molten steel of a refractory and increasing a thermal conductivity thereof. Particularly, natural graphite is suitable for obtaining the above-mentioned function. When the content of graphite is under 10 wt. %, however, a desired effect as described above cannot be obtained, and a spalling resistance is poor. When the content of graphite is over 30 wt. %, on the other hand, a corrosion resistance is degraded. The content of graphite should therefore be limited within the range of from 10 to 30 wt. %. Graphite should preferably have an average particle size of up to 500 μm to improve the above-mentioned functions.

(4) Silica:

Silica has a function of promoting movement of calcium oxide in each particle of zirconia clinker toward the surface of each particle of zirconia clinker and gathering there. Silica has furthermore a function of reducing the thermal expansion coefficient of zirconia clinker and improving the spalling resistance thereof. When the content of silica is under 1 wt. %, however, a desired effect as described above cannot be obtained. When the content of silica is over 15 wt. %, on the other hand, the structure of the refractory is deteriorated, with a lower corrosion resistance. The content of silica should therefore be limited within the range of from 1 to 15 wt. %. With a view to achieving a satisfactory dispersibility of silica and improving the above-mentioned functions of silica, silica should preferably have an average particle size of up to 20 μm.

(5) Magnesia:

Magnesia has, like silica, a function of promoting movement of calcium oxide in each particle of zirconia clinker towards the surface of each particle of zirconia clinker and gathering there. When the content of magnesia is under 1 wt. %, however, a desired effect as described above cannot be obtained. When the content of magnesia is over 15 wt. %, on the other hand, reaction of magnesia with alumina in molten steel produces spinel ($MgO \cdot Al_2O_3$), resulting in easier deposition and accumulation of the non-metallic inclusions such as spinel onto the surface of the bore of the molten steel pouring nozzle. With a view to achieving a satisfactory dispersibility of magnesia and improving the above-mentioned function of magnesia, magnesia should preferably have an average particle size of up to 20 μm. When both magnesia and silica are contained in the refractory, the above-mentioned effects of magnesia and silica can be synergetically improved.

Now, an embodiment of the molten steel pouring nozzle of the present invention is described with reference to the drawing.

FIG. 1 is a schematic vertical sectional view illustrating an embodiment of the molten steel pouring nozzle of the present invention as an immersion nozzle. The molten steel pouring nozzle of this embodiment is used as an immersion nozzle which is arranged between a tundish and a vertical mold arranged below the tundish. As shown in FIG. 1, the molten steel pouring nozzle 4 of the present invention has along the axis thereof a bore 1 through which molten steel flows. An inner portion 2 of the molten steel pouring nozzle 4, which forms the bore 1, is formed with a refractory having the above-mentioned chemical composition. An outer portion 3, which surrounds the inner portion 2, is formed with a refractory, for example, an alumina-graphite refractory which has an excellent erosion resistance against molten steel. According to the above-mentioned molten steel pouring nozzle 4, it is possible to prevent deposition and accumulation of the non-metallic inclusions such as α-alumina present in molten steel onto the surface of the inner portion 2 of the molten steel pouring nozzle 4, which forms the bore 1, for a long period of time.

Now, the molten steel pouring nozzle of the present invention is described more in detail by means of an example.

EXAMPLE

First, calcium oxide (CaO) and zirconia ($ZrO_2$) were melted in an electric furnace at a temperature of at least 1,600° C., then the resultant melt was cooled to a room temperature to solidify same, and then the resultant solid was pulverized in a ball mill to prepare zirconia clinker having an average particle size of up to 44 μm.

The content of calcium oxide in the thus prepared zirconia clinker was within the range of from 3 to 35 weight parts relative to 100 weight parts of zirconia clinker.

Then, phenol resin in the state of powder and liquid in an amount of from 5 to 10 wt. % was added to each of the blended raw materials Nos. 1 to 3 including the above-mentioned zirconia clinker thus prepared, having the chemical compositions within the scope of the present invention as shown in Table 1. Each of these blended raw materials Nos. 1 to 3 with added phenol resin was mixed and kneaded to obtain a kneaded mass. A formed body having dimensions of 30 mm×30 mm×250 mm for testing an amount of deposition of the non-metallic inclusions such as α-alumina, and another tubular formed body having an outside diameter of 100 mm; an inside diameter of 40 mm and length of 250 mm for testing a spalling resistance, were formed from each of the thus obtained kneaded masses. Then, these formed bodies were reduction-fired at a temperature within the range of from 1,000° to 1,200° C. to prepare samples (hereinafter referred to as the "samples of the invention") Nos. 1 to 3.

Then, phenol resin in the state of powder and liquid in an amount of from 5 to 10 wt. % was added to each of the blended raw materials Nos. 4 to 6 including the above-mentioned zirconia clinker thus prepared, having the chemical compositions outside the scope of the present invention as shown in Table 1. Each of these blended raw materials Nos. 4 to 6 with added phenol resin was mixed and kneaded to obtain a kneaded mass. A formed body having dimensions of 30 mm×30 mm×250 mm for testing an amount of deposition of the non-metallic inclusions such as α-alumina, and another tubular formed body having an outside diameter of 100 mm, an inside diameter of 40 mm and a length of 250 mm for testing a spalling resistance, were formed from each of the thus obtained kneaded masses. Then, these formed bodies were reduction-fired at a temperature within the range of from 1,000° to 1,200° C. to prepare samples (hereinafter referred to as the "samples for comparison") Nos. 4 to 6.

TABLE 1

| Chemical Composition of blended raw material | (wt. %) | | | | | |
|---|---|---|---|---|---|---|
| | Sample of the invention | | | Sample for comparison | | |
| | No. 1 | No. 2 | No. 3 | No. 4 | No. 5 | No. 6 |
| Zirconia clinker containing calcium oxide | 85 | 70 | 80 | — | — | 90 |
| Graphite | 10 | 10 | 15 | 10 | 15 | 10 |
| Silica | 5 | 10 | 5 | — | — | — |
| Magnesia | — | 10 | — | — | — | — |
| Alumina | — | — | — | — | 80 | — |
| Silicon carbide | — | — | — | 10 | 5 | — |
| Baddeleyite | — | — | — | 80 | — | — |

For each of the above-mentioned samples of the invention Nos. 1 to 3 and the samples for comparison Nos. 4 to 6, a bulk specific gravity, an apparent porosity (%) and a bending strength (kg/cm²), and surface properties including an average roughness Ra (μm), a maximum height Rmax (μm), and a ten-point average roughness Rz-D (μm) were measured. The results are shown in Table 2.

Then, each of the tubular samples of the invention Nos. 1 to 3 and the tubular samples for comparison Nos. 4 to 6 having an outside diameter of 100 mm, an inside diameter of 40 mm and a length of 250 mm, was heated in an electric furnace at a temperature of 1,550° C. for 30 minutes, and then rapidly water-cooled to investigate a spalling resistance. The results are shown in Table 2.

Subsequently, each of the samples of the invention Nos. 1 to 3 and the samples for comparison Nos. 4 to 6 having dimensions of 30 mm×30 mm×250 mm was immersed in molten steel at a temperature of 1,550° C. containing aluminum in an amount within the range of from 0.05 to 0.10 wt. % for 180 minutes to investigate an erosion ratio (%) and an amount of deposition (mm) of the non-metallic inclusions such as α-alumina. The results are also shown in Table 2.

TABLE 2

| | Sample of the invention | | | Sample for comparison | | |
|---|---|---|---|---|---|---|
| | No. 1 | No. 2 | No. 3 | No. 4 | No. 5 | No. 6 |
| Bulk specific gravity | 3.05 | 2.91 | 3.02 | 3.43 | 2.70 | 3.15 |
| Apparent porosity (%) | 21.0 | 20.9 | 19.6 | 14.0 | 15.4 | 19.8 |
| Bending strength (Kg/cm²) | 98 | 115 | 108 | 118 | 98 | 110 |
| Surface property | | | | | | |
| Average roughness Ra (μm) | 2.3 | 2.4 | 2.4 | 2.5 | 3.4 | 3.0 |
| Maximum height Rmax (μm) | 19.5 | 20.5 | 21.4 | 26.2 | 54.3 | 30.4 |
| ten-point average roughness Rz-D (μm) | 15.8 | 16.3 | 16.7 | 18.3 | 28.6 | 28.7 |
| Erosion ratio (%) | 10 | 15 | 10 | 5 | 2 | 5 |
| Spalling resistance | No crack | No crack | No crack | No crack | No crack | Crack occurrence |
| Amount of deposition (mm) | Almost zero | Almost zero | Almost zero | 5 | 15 | 15 |

As is clear from Table 2, all the samples of the invention Nos. 1 to 3 are excellent in the surface properties, with in addition a low erosion ratio, so that it is possible to avoid deterioration of the structure of the refractory. The samples of the invention Nos. 1 to 3 have furthermore an excellent spalling resistance and have no deposition of the non-metallic inclusions such as α-alumina, thus permitting effective prevention of reduction or clogging of the bore of the molten steel pouring nozzle. All the samples for comparison Nos. 4 to 6 have in contrast a large amount of deposition of the non-metallic inclusions such as α-alumina. Particularly, the sample for comparison No. 6, having a higher content of zirconia clinker outside the scope of the present invention, shows a very poor spalling resistance, and because of the absence of silica and magnesia, shows a large amount of deposition of the non-metallic inclusions such as α-alumina.

Then, phenol resin in the state of powder and liquid in an amount of from 5 to 10 wt. % was added to each of the blended raw materials Nos. 1 and 3 having the chemical compositions within the scope of the present invention as shown in Table 1. Each of the raw materials Nos. 1 and 3 with added phenol resin was mixed and kneaded to obtain a kneaded mass. As shown in FIG. 1, each of the thus obtained kneaded masses was used for the inner portion 2 of the molten steel pouring nozzle 4, which inner portion 2 formed the bore 1, and an alumina-graphite refractory was used for the outer portion 3 of the molten steel pouring nozzle 4 so as to surround the above-mentioned inner portion 2. The inner portion 2 and the outer portion 3 were integrally formed by means of the known isostatic pressing under a forming pressure of 1 ton/cm$^2$, and then reduction-fired at a temperature within the range of from 1,000° to 1,200° C. to prepare molten steel pouring nozzles as immersion nozzles (hereinafter referred to as the "nozzles of the invention") Nos. 1 and 3.

For comparison purposes, a known molten steel pouring nozzle, in which an inert gas was ejected from the surface of the bore of the nozzle toward molten steel flowing through the bore (hereinafter referred to as the "nozzle for comparison"), was provided.

Then, in a continuous casting machine using a 250-ton ladle and a 25-ton tundish, the nozzles of the invention Nos. 1 and 3 and the nozzle for comparison, were fitted between the tundish and a vertical mold arranged below the tundish, and an aluminum-killed molten steel containing aluminum in an amount within the range of from 0.05 to 0.06 wt. % was continuously cast for 400 minutes, to investigate the state of deposition of the non-metallic inclusions such as α-alumina for each of the nozzles of the invention Nos. 1 and 3 and the nozzle for comparison.

According to the result, the amount of the non-metallic inclusions such as α-alumina having deposited onto the surface of the bore each of the nozzles of the invention Nos. 1 and 3 was within the range of from 0 to 2 mm, whereas that in the nozzle for comparison was within the range of from 4 to 12 mm.

As is evident from the above description, in the samples of the invention Nos. 1 to 3 as well as in the nozzles of the invention Nos. 1 and 3, deposition of the non-metallic inclusions such as α-alumina is effectively inhibited.

This can also be said in the case where the molten steel pouring nozzle of the present invention is used as a feed nozzle for horizontal-type continuous casting.

According to the molten steel pouring nozzle of the present invention, as described above in detail, it is possible to stably prevent reduction or clogging of the bore of the nozzle by the non-metallic inclusions such as α-alumina for a long period of time without causing degradation of the structure of the refractory.

What is claimed is:

1. A molten steel pouring nozzle having along the axis thereof a bore through which molten steel flows, comprising
at least part of an inner portion of said molten steel pouring nozzle, which inner portion forms said bore, is formed from a refractory consisting essentially of:
from 40 to 85 wt. % of a zirconia clinker comprising cubic zirconia and calcium zirconate, the content of calcium oxide in said zirconia clinker being from 3 to 35 weight parts relative to 100 weight parts of said zirconia clinker;
graphite: from 10 to 30 wt. %;
and
at least one element selected from the group consisting of:
silica: from 1 to 15 wt. %, and
magnesia: from 1 to 15 wt. %.

2. The molten steel pouring nozzle as claimed in claim 1, wherein:
the whole of said molten steel pouring nozzle is formed from said refractory.

3. The molten steel pouring nozzle as claimed in claim 1, wherein:
said inner portion of said molten steel pouring nozzle, which inner portion forms said bore, is formed from said refractory.

4. The molten steel pouring nozzle as claimed in claim 2, wherein:
said zirconia clinker has an average particle size of up to 44 μm; said graphite has an average particle size of up to 500 μm; and said silica and said magnesia have an average particle size of up to 20 μm.

5. The molten steel pouring nozzle as claimed in claim 3, wherein:
said zirconia clinker has an average particle size of up to 44 μm; said graphite has an average particle size of up to 500 μm; and said silica and said magnesia have an average particle size of up to 20 μm.

6. The molten steel pouring nozzle as claimed in claim 1, wherein:
said zirconia clinker has an average particle size of up to 44 μm; said graphite has an average particle size of up to 500 μm; and said silica and said magnesia have an average particle size of up to 20 μm.

7. The molten steel pouring nozzle as claimed in claim 1, wherein said refractory consists essentially of said zirconia clinker, said graphite and said silica.

8. The molten steel pouring nozzle as claimed in claim 1, wherein said refractory consists essentially of said zirconia clinker, said graphite and said magnesia.

9. The molten steel pouring nozzle as claimed in claim 1, wherein said refractory consists essentially of said zirconia clinker, said graphite, said silica and said magnesia.

10. The molten steel pouring nozzle as claimed in claim 1, wherein said refractory consists essentially of 85 wt. % of said zirconia clinker, 10 wt. % of said graphite and 5 wt. % of said silica.

11. The molten steel pouring nozzle as claimed in claim 1, wherein said refractory consists essentially of 70 wt. % of said zirconia clinker, 10 wt. % of said graphite, 10 wt. % of said silica and 10 wt. % of said magnesia.

12. The molten steel pouring nozzle as claimed in claim 1, wherein said refractory consists essentially of 80 wt. % of said zirconia clinker, 15 wt. % of said graphite and 5 wt. % of said silica.

* * * * *